US011822856B2

(12) United States Patent
Luo

(10) Patent No.: US 11,822,856 B2
(45) Date of Patent: Nov. 21, 2023

(54) REAL-TIME SERVICE PLAYBACK METHOD AND DEVICE

(71) Applicant: PATEO CONNECT+(Nanjing)Co., Ltd., Nanjing (CN)

(72) Inventor: Jun Luo, Shenyang (CN)

(73) Assignee: PATEO CONNECT+(NANJING) CO., LTD., Nanjing (CN)

( * ) Notice: Subject to any disclaimer, the term of this patent is extended or adjusted under 35 U.S.C. 154(b) by 0 days.

(21) Appl. No.: 17/967,192

(22) Filed: Oct. 17, 2022

(65) Prior Publication Data

US 2023/0251816 A1     Aug. 10, 2023

(30) Foreign Application Priority Data

Feb. 7, 2022  (CN) .......................... 202210116595.1

(51) Int. Cl.
  G06F 3/16       (2006.01)
  G06F 3/04847    (2022.01)
(52) U.S. Cl.
  CPC .......... G06F 3/165 (2013.01); G06F 3/04847 (2013.01)
(58) Field of Classification Search
  None
  See application file for complete search history.

(56) References Cited

U.S. PATENT DOCUMENTS

| 2005/0244138 | A1* | 11/2005 | O'Connor | .......... H04N 21/4147 |
| 2013/0003993 | A1* | 1/2013 | Michalski | ........... G06F 3/04842 |
| | | | | 381/119 |
| 2013/0294755 | A1* | 11/2013 | Arme | ..................... G11B 27/28 |
| | | | | 386/E5.041 |

* cited by examiner

*Primary Examiner* — Tuan S Nguyen
(74) *Attorney, Agent, or Firm* — ANOVA LAW GROUP, PLLC

(57) ABSTRACT

A real-time service playback method includes, during running a real-time service, in response to receiving an input instruction, obtaining a playback speed and a time coordinate of a first anchor point, the time coordinate of the first anchor point being a start point of playback, and in response to the input instruction, stopping playing a real-time content of the real-time service, based on the time coordinate of the first anchor point, calculating a time coordinate of a second anchor point in future, and reading and storing a real-time content between a time coordinate value of the first anchor point and a time coordinate value of the second anchor point to play according to the playback speed until the playback reaches the time coordinate value of the second anchor point to resume the real-time service. The time coordinate of the second anchor point is an end point of the playback.

18 Claims, 8 Drawing Sheets

REAL-TIME SERVICE PLAYBACK METHOD AND DEVICE

CROSS-REFERENCE TO RELATED APPLICATION

This application claims priority to Chinese Patent Application No. 202210116595.1, filed on Feb. 7, 2022, the entire content of which is incorporated herein by reference.

TECHNICAL FIELD

The present disclosure relates to the data processing field and, more particularly, to a real-time service playback method and a real-time service playback device for live streaming.

BACKGROUND

Currently, a user has high expectations for timely receiving various types of information. Radio, audio, video, and TV program that broadcast in real-time provide the user with relatively fast and targeted information. However, a problem that the information cannot be listened to repeatedly in a short time period and can be missed often exists. Thus, the integrity and effectiveness of the information received by the user may be affected.

When the user listens to a program played by an in-vehicle system, and interesting content or key information is played, since the played program is broadcasted in real-time, the user cannot repeatedly listen to the content that was played earlier. Although the content of the radio, live streaming, and audio and video is recorded and saved in some existing technologies, when the recorded content is played back directly, the following content that is to be played is missed. Therefore, the user usually waits a while and selects playback. If the user forgets the time or name of the program when selecting the playback, the user is difficult to find the key content that the user is interested in accurately again.

For example, for a real-time service vehicle radio, an operation function provided by the existing radio is relatively simple. Only a few fixed functions are provided for the real-time broadcast service, such as search, previous, and next. These operable functions are often aimed at the selection of the source of the real-time broadcast content. For the broadcast content with the fixed source that is playing, the radio does not have more personalized selection, which negatively impacts user experience.

SUMMARY

Embodiments of the present disclosure provide a real-time service playback method. The method includes, during running a real-time service, in response to receiving an input instruction, obtaining a playback speed and a time coordinate of a first anchor point, the time coordinate of the first anchor point being a start point of playback, and in response to the input instruction, stopping playing a real-time content of the real-time service, based on the time coordinate of the first anchor point, calculating a time coordinate of a second anchor point in future, and reading and storing a real-time content between a time coordinate value of the first anchor point and a time coordinate value of the second anchor point to play according to the playback speed until the playback reaches the time coordinate value of the second anchor point to resume the real-time service. The time coordinate of the second anchor point is an end point of the playback.

Embodiments of the present disclosure provide a real-time service playback device, including a communication unit, a cache unit, and a processor. The processor is configured to control the communication unit to receive a live streaming content of a real-time service. The processor is further configured to control the cache unit to store the live streaming content from the communication unit, in response to receiving an input instruction, play the stored live streaming content from a time coordinate of a first anchor point at a playback speed, and in response to finishing playing the stored live streaming content, resume the live streaming content that is played in real-time.

DETAILED DESCRIPTION OF THE EMBODIMENTS

The following description is used to disclose the present disclosure to enable those skilled in the art to implement the present disclosure. The described embodiments below are merely examples. Those skilled in the art may think of other obvious variations. The basic principle defined in the following description of the present disclosure may be applied to other implementations, variated solutions, improved solutions, equivalent solutions, and other technical solutions without departing from the spirit and the scope of the present disclosure.

Those of ordinary skill in the art may realize that various illustrative logical blocks (ILBs) and steps described in connection with embodiments of the present disclosure may be implemented in electronic hardware or a combination of computer software and electronic hardware. Whether these functions are performed in hardware or software depends on the specific application and design constraint of the technical solution. For each specific application, those skilled in the art may realize the described function in different methods. Such implementation should not be considered beyond the scope of the present disclosure.

Figure 1:
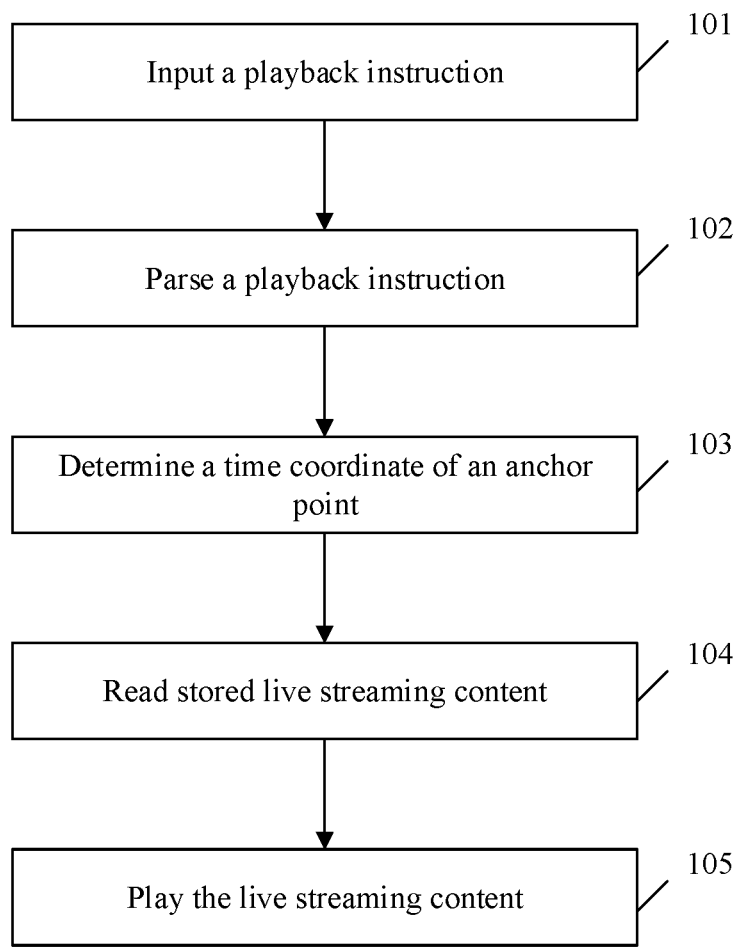
FIG. 1 is a schematic flowchart of a real-time service playback method according to some embodiments of the present disclosure.

FIG. 1 is a schematic flowchart of a real-time service playback method according to some embodiments of the present disclosure.

Before step 101, a live streaming service is in a running state, and the current playback service is in a ready state.

At 101, a playback instruction is inputted, and a time node of the playback instruction that is inputted corresponds to a time coordinate of a reference anchor point. For example, the input playback instruction may be an action of dragging a progress bar in a touch-enabled interactive device and a click on a button that provides a playback function. The playback instruction may include time information, content information, and playback speed information.

In some embodiments, the user may be listening to a radio program, and the radio station may broadcast a piece of breaking news. Since the content of the live news includes various types of information such as time, location, and person, the user may not hear the earlier live streaming content clearly, and the live streaming may continue. The user may input a playback instruction, for example, may click a playback button to control or command the live streaming content played in the past to be repeatedly played at a predetermined speed for the user to listen to.

At 102, the playback instruction is parsed. In some embodiments, the playback instruction input by the user may be parsed. The playback instruction may refer to the live streaming content in a past time period. The playback instruction may also refer to the control of pausing the current live streaming. The parsing may be performed to obtain the information included in the playback instruction. For example, the information may include a past time node that the playback is returned to, a playback speed of the live streaming content of the past time period during the playback, and an instruction for obtaining the live streaming content in the past time period.

In some embodiments, the past time node may be 15 seconds before the current time node. The live streaming content may be the radio program that the user has listened to in the past 15 seconds. The live streaming content may include the key information that the user wants to listen to again. The playback speed may be 1.2 time-speed, which is used to repeatedly play the live streaming content of the past 15 seconds.

In some embodiments, the playback speed may be associated with a number of times of repeated playback. For example, when the user wants to listen to the live streaming content of the past time period once, the playback speed may be 1.2 time-speed. When the user wants to listen to the live streaming content of the past time period twice, the playback speed may be 1.4 time-speed.

After the playback instruction is parsed, according to the playback instruction obtained by the parsing, an anchor point time coordinate is further determined (103). A time coordinate of a first anchor point may be determined according to the parsed playback instruction. The time coordinate of the first anchor point may be the time node where the playback starts indicated by the playback instruction. A time coordinate of the second anchor point may be further calculated according to the time coordinate of the first anchor point. The time coordinate of the second anchor point may be a time node when the playback ends indicated by the playback instruction. A calculation rule of the time coordinate of the second anchor point may be associated with a time coordinate value of the first anchor point, a time coordinate value of the second anchor point, a playback speed, and a number of repeated times. A time coordinate value of an anchor point may be a value assigned by a corresponding time node.

At 104, the saved live streaming content is further read according to the live streaming content between the time coordinate value of the first anchor point and the time coordinate value of the second anchor point.

Before the user inputs the playback instruction, the method may further include saving first cache data between the time coordinate of the first anchor point and the time coordinate of the reference anchor point. For example, the saving may include an offline cache or local download of the audio data being live streamed by the radio station.

After the user inputs the playback instruction, the stored first cache data may be read and played at 2 time-speed. At the same time, before reaching the time coordinate of the second anchor point, the second cache data between the time coordinate of the reference anchor point and the time coordinate of the second anchor point may be saved. When the playback reaches the time coordinate of the reference anchor point, the saved second cache data may be read and played at 2 time-speed.

When the first cached data and the second cached data are played, the playback service is in a running state, and the live streaming service is in a ready state.

At 105, when the time coordinate of the second anchor point is reached, the playing of the second cache data ends, and the live content starts to play. At this time, the live streaming service resumes the running state, and the playback service is in a ready state, waiting for the next playback instruction.

Figure 2A:
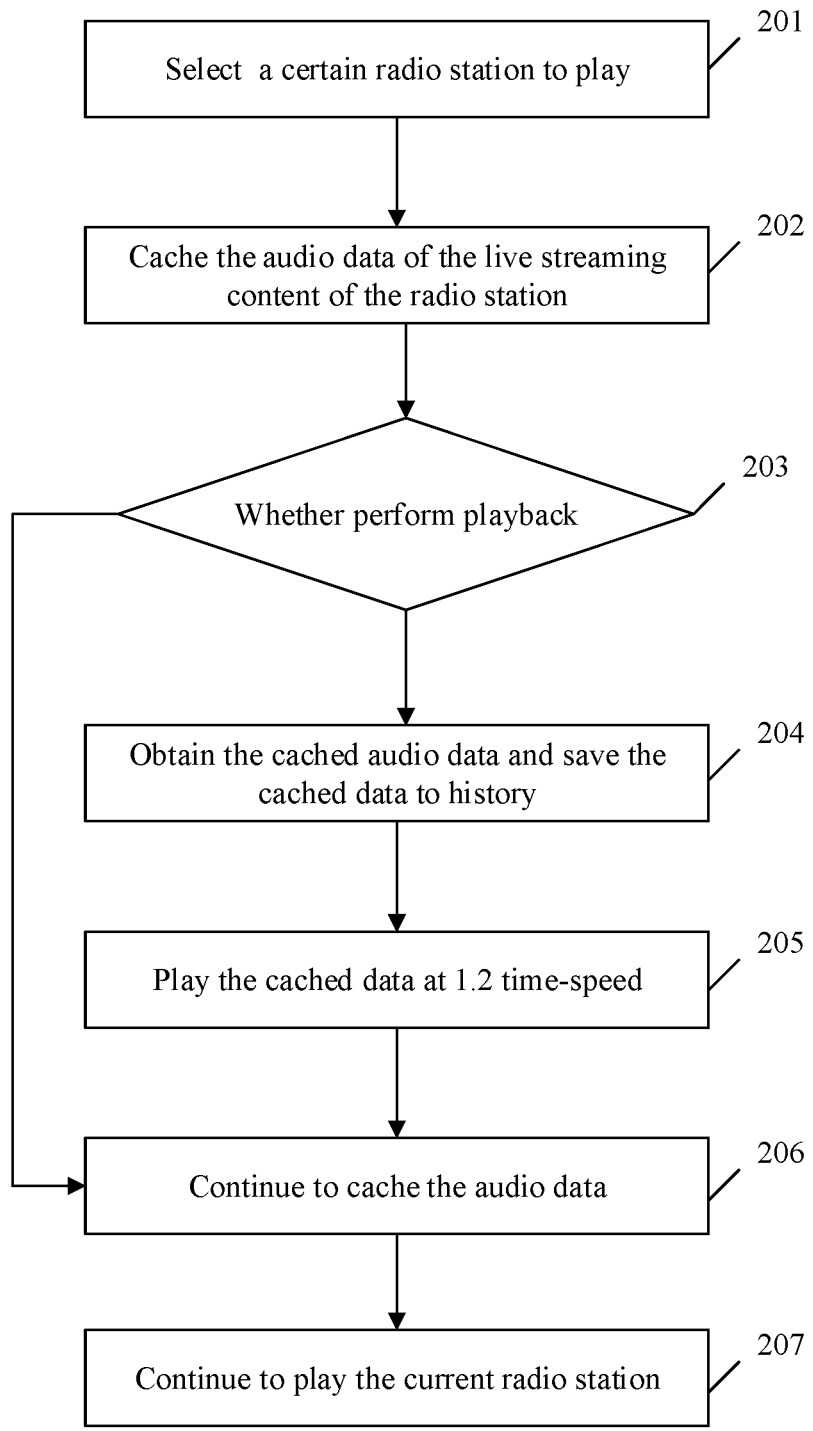
FIG. 2A is a schematic flowchart showing a switch method of a live streaming service and a playback service according to some embodiments of the present disclosure.

FIG. 2A is a schematic flowchart showing a switch method of a live streaming service and a playback service according to some embodiments of the present disclosure.

In some embodiments, first, the user selects a certain radio station to play (201). The live streaming service is in a running state. Simultaneously, the audio data of the live streaming content of the radio station is cached (202). The audio data is saved, and the playback service is currently in a ready state.

At 203, during the live streaming of the radio station, whether the input instruction causes the playback is determined.

If the input instruction causes the playback, an input instruction from the user may be received. The input instruction may include that the user selects the playback service when the playback service is needed. The input instruction may include playback to a past time node, the playback speed of the audio data of the past time period during the playback, and the instruction to obtain the audio data of the past time period.

After receiving the input instruction from the user, the audio data corresponding to the user input instruction may be selected from the cached audio data. The cached audio data is obtained, and the cached data is saved to history (204). The audio data may include the audio data of the live streaming content of the radio station that is cached and saved before the user inputs the instruction. The history record may be a collection operation for the audio data to be played back by the user.

After the history is saved, a service operation switching node of the playback service may be calculated. The service switching time node is related to playback to a past time node and the playback speed of the audio data for the past time period during playback.

Then, the live streaming service may be paused, and pausing the live streaming service may be determined by the input instruction. In some embodiments, the live streaming service may be switched to the playback service. Thus, the playback service may be in a running state, and the live streaming service may be in a ready state. When the playback is between the past time node and the service switching time node, the cached data is played at 1.2 time-speed (205).

After reaching the service switching time node of the playback service, the playback service may be switched back to the live streaming service, and the current live streaming service may be in a running state.

During the process of the live streaming service, the audio data continues to be cached and saved (206). The current playback service may be in a ready state while the device waits for a next input instruction.

At 207, the current radio station continues to be played to restore the live streaming service of the radio station.

When the input instruction does not cause the playback, process 206 may be executed to continue to cache the audio data.

In some embodiments, the vehicle radio may be playing a radio program. During the live streaming of the radio program, the audio data of the radio program that has been played may be cached, and the audio data of the radio program may be saved.

During the live streaming of the radio program, the input instruction may be received from the user who is listening to the radio program. Whether the user needs the playback of the radio program may be determined. If the user needs the playback of the radio program, the information included in the input instruction may be read. Then, the information included in the input instruction may be parsed. The information may include a playback start time node, the playback audio data of the radio program, and the playback speed of the playback audio data.

In some other embodiments, the information may further include a number of repetitions of the playback of the audio data. The number of repetitions may be related to the playback speed. For example, when the user wants to listen to the live streaming content of the past time period once, the playback speed may be 1.2 time-speed. When the user wants to listen to the live streaming content of the past time period twice, the playback speed may be 1.4 time-speed.

Further, the method may include determining the service operation switching node.

Then, a first switching process is executed. The first switching process is switching from the current live streaming process of the radio program to the playback process in which the audio of the radio program has been played.

Starting from the playback start time node, the audio data of the radio program indicated by the read input instruction may be played according to the playback speed information contained in the read input instruction.

When the audio data of the radio program is played to the service operation switching node, a second switching process may be executed, and the second switching process is to switch from the playback process of the audio of the radio program to the live streaming process of the current radio program. Thus, the live streaming process of the radio program may be resumed, the audio of the radio program that has been played continues to be buffered, and the audio data of the radio program is saved.

Figure 2B:
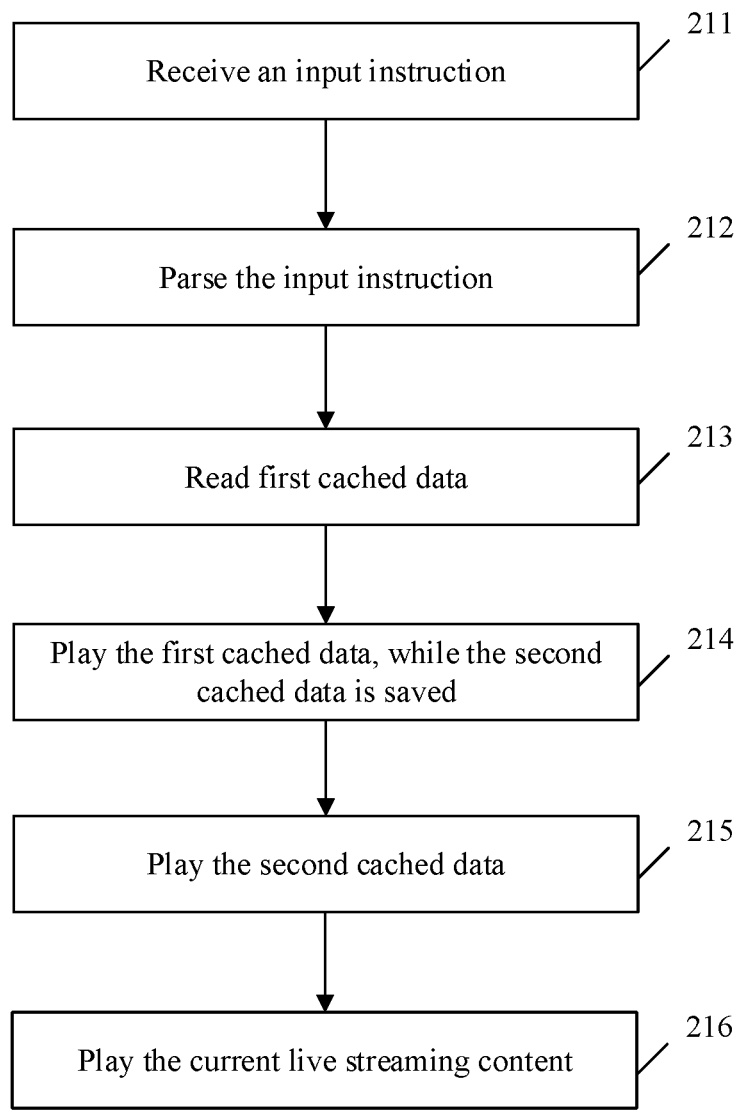
FIG. 2B is a schematic flowchart showing a data caching method of live streaming service playback according to some embodiments of the present disclosure.

FIG. 2B is a schematic flowchart showing a data caching method of live streaming service playback according to some embodiments of the present disclosure.

At 211, an input instruction is received.

At 212, the input instruction is parsed. In some embodiments, the information referred to by the input instruction includes acquiring the time coordinate of the reference anchor point, the time coordinate of the first anchor point, the time coordinate of the second anchor point, and reading the cached data between the time coordinates.

In some embodiments, the information referred to by the input instruction includes acquiring the time coordinate coordinates of the first anchor point and buffered data from the time coordinates of the first anchor point. A difference from the above-mentioned embodiment is that only the time coordinate of the first anchor point and the cached data starting from the time coordinate of the first anchor point are required.

The time coordinate of the reference anchor point may be the time node at which the instruction is input when the live streaming service is in the running state. The time coordinate of the first anchor point may be the time node at which the playback service enters the running state and the live streaming service is in the ready state. The time coordinate of the second anchor point may be the time node when the live streaming service resumes the running state and the playback service is in the ready state.

The cached data may include first cached data and second cached data.

Before the input instruction is received, the live streaming service may be in the running state.

Before the input instruction is received, the playback service may be in the ready state. The first cached data may be saved. The first cached data may be the audio data corresponding to the live streaming content provided by the live streaming service between the time coordinate of the reference anchor point and the time coordinate of the first anchor point.

At 213, the cached data is read in response to the parsed input instruction. In some embodiments, the first cached data may be read.

Then, the method may further include, when all the cached data starting from the time coordinate of the first anchor point has been played, switching to the live streaming service. That is, when the recorded content starting from the time coordinate of the first anchor point has been played, the current time node may be used as the node of the switching process. Thus, the live streaming service may be in the running state, the playback service may be in the ready state, and the current live streaming content may be resumed.

In some embodiments, the switching process may include processes 214 to 216.

At 214, the first cached data is played until the time coordinate of the reference anchor point is reached. While the first cached data is played, the second cached data may continue to be saved. The second cached data may be the live streaming content provided by the live streaming service between the time coordinate of the first anchor point and the time coordinate of the second anchor point.

At 215, when the playback of the first cached data ends, and the playback service runs from the time coordinate of the first anchor point to the time coordinate of the reference anchor point, the second cached data is played until the playback service reaches the time coordinate of the second anchor point.

At 216, when the playback of the second cached data ends, and the playback service reaches the time coordinate of the second anchor point from the time coordinate of the reference anchor point, the playback service is switched to the live streaming service. The live streaming service may be in the running state, and the playback service may be in the ready state. Then, the current live streaming content may be resumed.

Figure 2C:
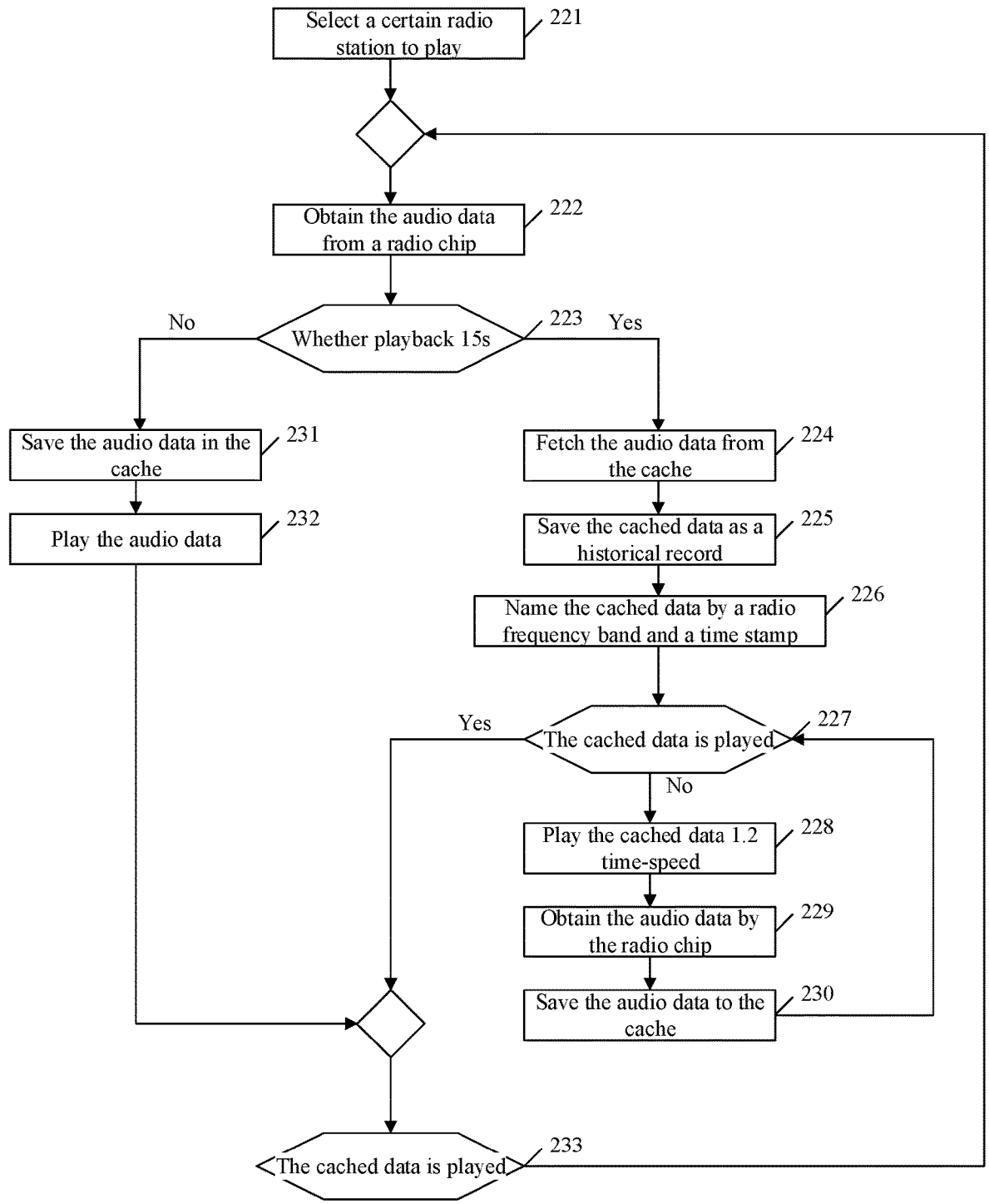
FIG. 2C is a schematic flowchart of a radio playback function according to some embodiments of the present disclosure.

FIG. 2C is a schematic flowchart of a radio playback function according to some embodiments of the present disclosure.

In some embodiments, the user may be driving a vehicle.

At 221, the user turns on the vehicle radio, selects a certain radio station to play, and listens to the live streaming radio program.

At 222, in response to the user selection, the audio data is obtained from a radio chip to prepare for the playing of the radio program.

At 223, whether to play back 15 seconds is determined.

If the user does not perform the playback operation for 15 seconds, the audio data 232 may be played in real-time while the cached data is continuously saved into the cache 231. Playing the audio data in real-time may be equivalent to playing the cached data in real-time, which is an instant save and access state. That is, if the user does not perform the playback operation for 15 seconds, the live streaming service of the radio program of the radio may be in the running state, and the playback service of the radio program of the radio may be in the ready state.

At 224, in response to the user performing the playback operation for 15 seconds, the audio data may be fetched from the cache to prepare to play back, so that the live streaming service is in the ready state, and the playback service is in the running state, that is, processes 213 to 216. In some embodiments, the audio data may be played at a certain playback speed. Thus, the playback content may be synchronized with the live streaming content being played within a certain time period.

At 227, whether the cached data has been played is determined. That is, when the recorded content starting from the time coordinate of the first anchor point has been played, the current time node may be used as the node of the switching process.

If the cached data is not finished, the playback service of the radio program of the radio may remain in the running state, and the live streaming service of the radio program of the radio may remain in the ready state.

At 228, the cached data is played at a certain speed. In some embodiments, the cached data may be played at 1.2 time-speed. The time-speed may be the playback speed of the cached data confirmed by performing the playback operation.

Further, when the playback service of the radio program is in the running state, and the live streaming service of the radio program of the radio is in the ready state, the data of the radio program that is being live streamed may be cached.

At 229, the radio chip obtains the audio data.

At 230, the audio data is saved to the cache to provide the cached data for the next playback.

At 233, when the cached data has been played, the playback service reaches the service operation switching node. The service operation switching node may be a time node confirmed by performing the playback operation.

After the playback service reaches the service running switching node, process 222 may be repeatedly performed to obtain the audio data from the radio chip.

Then, at 232, the audio data is played in real-time. The live streaming service of the radio program of the radio may be switched to the running state, and the playback service of the radio program of the radio may be switched to the ready state.

According to the above embodiments, only the time coordinate of the first anchor point may need to be provided.

At 225, after process 224 is performed, the cached data is saved as a historical record. The history record may be a function provided by the radio for the user to listen to the cached data after the playback. Here, the retained history record may be the data from the time coordinate of the first anchor point to the time coordinate of the second anchor point or may be the data from the time coordinate of the first anchor point to the time coordinate of the reference anchor point, that is, the first cached data, or the first cached data and the second cached data.

At 226, a name is given to the cached data. In some embodiments, a naming rule may include a radio frequency band and a time stamp, e.g., "FM98.5+1643022366-1643022388."

Figure 2D:
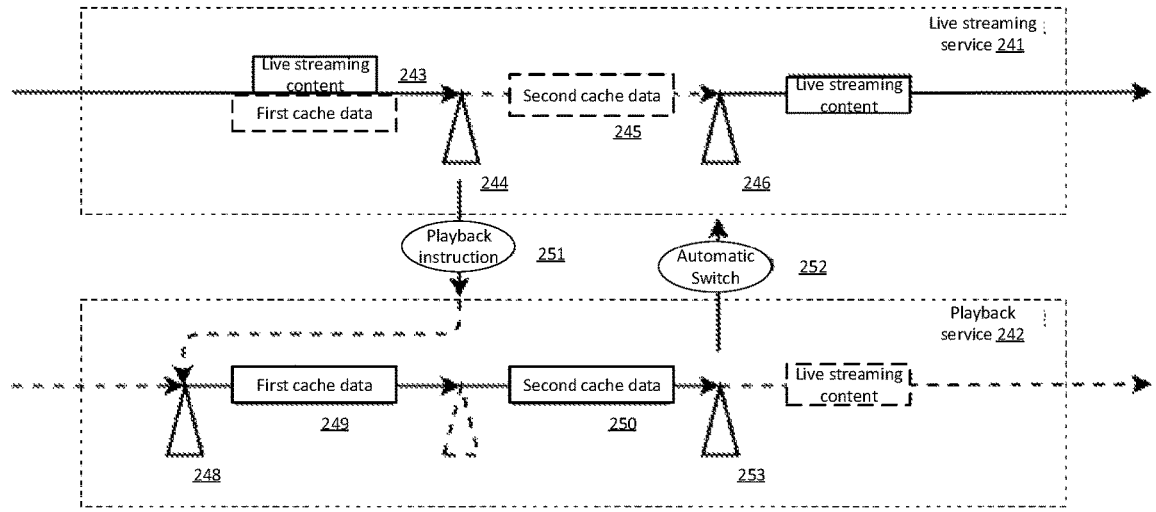
FIG. 2D is a schematic diagram of a real-time service playback method according to some embodiments of the present disclosure.

FIG. 2D is a schematic diagram of a real-time service playback method according to some embodiments of the present disclosure. In some embodiments, FIG. 2D illustrates the operation and switching process of the live service and the replay service.

In some embodiments, the live streaming service 241 may be running and in the running state, and the playback service 242 may be in the ready state. The playback object may be the live streaming content 243. The live streaming content 243 may be cached, and the first cached data 249 may be saved, simultaneously.

When the live streaming service 241 runs to the time coordinate 244 of the reference anchor point, the playback instruction 251 may be received. The playback instruction 251 may be parsed. The information indicated by the playback instruction 251 may include obtaining the time coordinate 248 of the first anchor point, the time coordinate 253 of the second anchor point, and the service operation switching node 246, determining the playback speed of the playback service, and reading the first cached data 249. In some embodiments, the playback speed may be determined according to the number of times of the playback.

In addition, in some other embodiments, the playback instruction 251 may include the time coordinate 248 of the first anchor point, and no additional time coordinate 253 of the second anchor point and the service operation switching node 246.

The time coordinate 244 of the reference anchor point may be the time node at which the playback instruction is inputted when the live streaming service 241 is in the running state. The time coordinate 248 of the first anchor point may be the time node when the playback service 242 enters the running state and the live streaming service 241 is in the ready state. The time coordinate 253 of the second anchor point may be the time node at which the playback service 242 ends. The service operation switching node 246 may be the time node when the live streaming service 241 resumes the running state and the playback service 242 is in the ready state.

In the playback service 242, the first cached data 249 may be played at a certain speed. The second cached data 250 may continue to be saved while the first cached data 249 is played. The second cached data 250 may be the live streaming content provided by the live streaming service 241 between the time coordinate 244 of the reference anchor point and the service operation switching node 246.

When the playing of the first cached data 249 ends, the second cached data 250 may be played at a certain speed immediately until the time coordinate 253 of the second anchor point is reached.

When the playback of the second cached data 250 reaches the time coordinate 253 of the second anchor, the playback service 242 may be switched to the live streaming service 241. The live streaming service 241 may be in the running state, and the playback service 242 may be in the ready state. Then, the playing of the live streaming content may be resumed from the service operation switching node 246.

Figure 3:
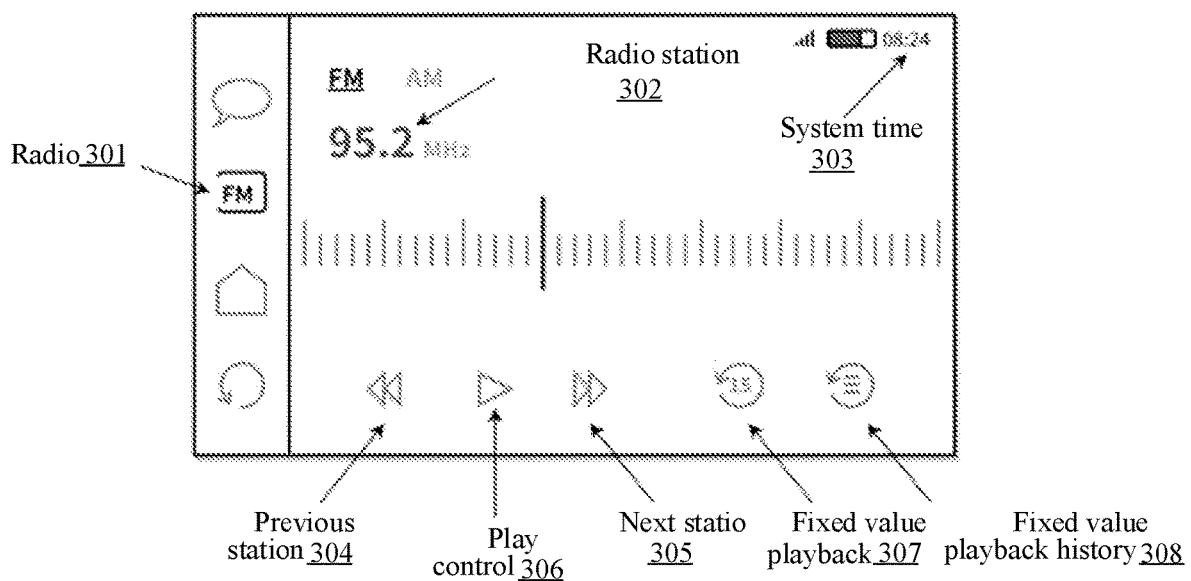
FIG. 3 is a schematic diagram showing a display interface of a radio fixed value playback function according to some embodiments of the present disclosure.
Figure 4:
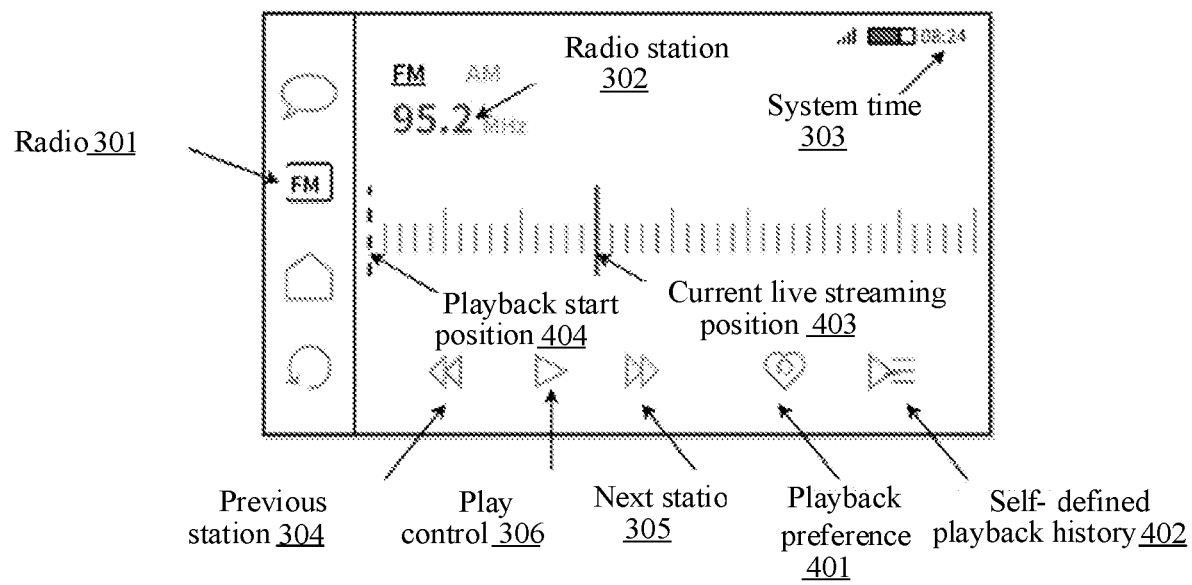
FIG. 4 is a schematic diagram showing a display interface of a radio self-defined playback function according to some embodiments of the present disclosure.
Figure 5:
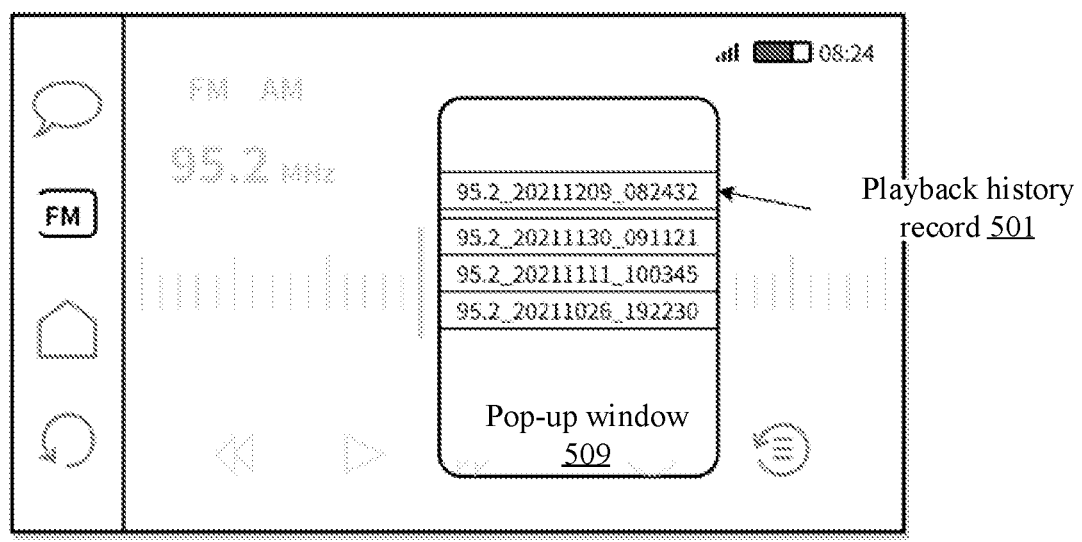
FIG. 5 is a schematic diagram showing an interface of a pop-up window of radio playback according to some embodiments of the present disclosure.

FIG. 3 is a schematic diagram showing a display interface of a radio fixed value playback function according to some embodiments of the present disclosure. FIG. 4 is a schematic diagram showing a display interface of a radio self-defined playback function according to some embodiments of the present disclosure. FIG. 5 is a schematic diagram showing an interface of a pop-up window of radio playback according to some embodiments of the present disclosure.

In some embodiments, the user may select a radio 301 having a live streaming real-time playback function on a vehicle display screen to listen to a live streaming radio program. For example, the radio 301 may be a piece of software installed to provide the radio live streaming service and a function of providing the radio live streaming in a system.

After the user turns on the radio 301, the user may select a radio station 302 to which the user wants to listen. The listened radio station 302 may be a program that is providing the live streaming service. Then, the user may listen to the radio station program that is live streamed. The program may provide a series of pieces of information in real-time, for example, local traffic information, breaking news, played music, entertainment, shopping advertisements, etc.

The current display interface may also provide system time 303, a previous station 304 and a next station 305 for switching the radio station, and a play control 306 for the radio station 302 that is currently being listened to.

After turning on the radio 301, the user may start to drive the vehicle. The user may listen to the radio program while driving. The radio 301 may be configured to cache the live streaming content of the radio station 302 that is being live streamed.

In the live streaming radio program, the user may suddenly hear a piece of breaking news, but may not hear a location where the news happened. The user may be very concerned about the news, but since the user is driving, the user may not record conveniently. In addition, the radio station 302 may continue to be live streamed. Thus, the user may operate a fixed value playback 307 to playback the news the user did not hear.

After the user operates the fixed value playback 307, the live streaming radio program may be quickly positioned to the time point 15 seconds ago. The user may listen to the news that was live streamed. The playback news may be played at the 1.2 time-speed. The playback content may include the location where the news happened that the user did not hear. The radio 301 may be configured to cache the live streaming content of the radio station 302 that is being live streamed after the corresponding playback position when the user operates the fixed value playback 307.

Within a certain time period, the playback may reach the corresponding playback position when the user operates the fixed value playback 307. The radio 301 may continue to playback the live streaming content of the radio station 302 when the user listens to the playback news. When the playback ends, the playback service may be switched to the live streaming service of the radio station 302. The user may continue to listen to the live streaming radio program.

After the user finishes driving, the user may recall the time appearing in the playback news that the user does not remember, and the user may need to listen again. The user may operate fixed value playback history 308 in the display interface. Then, a pop-up window 509 is displayed. The user may review a playback history record 510 saved in the pop-up window 509. Each playback history record 510 in the pop-up window 509 may be named with a frequency band value of the radio station 302 which is listened to and the playback start time information. For example, the news played back by the user may be named in a form of "95.2_20211209_082432." 95.2 may represent a frequency band of the radio station 302 which is listened to, 20211209 may represent the date the user listens to the playback, and 082432 may represent corresponding system time 303 and a detailed time point that the playback starts. The user may listen to the playback news again and record the time information that the user needs.

In some other embodiments, the user may select the radio 301 with the live streaming real-time playback function to listen to the live streaming radio program. For example, the radio 301 may be a piece of software installed to provide the live streaming radio service and the function of providing the live streaming service of the radio in the system.

After turning on the radio 301, the user may select the radio station 302 to which the user wants to listen. The listened radio station 302 may be the program that provides the live streaming service. Thus, the user may listen to the live streaming radio program. The program may provide a series of pieces of information in real-time, for example, the local traffic information, the breaking news, the music that is played, the entertainment, the shopping advertisements, etc.

The current display interface may also provide display of the system time 303, the previous station 304 and the next station 305 for switching the radio stations, and the play control 306 for the radio station 302 which is currently being listened to.

After turning on the radio 301, the user may start to drive the vehicle aft. While driving, the user may listen to the live streaming radio program. The radio 301 may be configured to simultaneously cache the live streaming content of the radio station 302 being live streamed.

In the live streaming radio program, the user may suddenly hear a shopping advertisement but did not hear the contact information of the advertisement. The user may want to remember the contact information of the advertisement. However, since the user is driving, the user may not record conveniently. The radio station 302 that is being listened to may continue to be live streamed. Thus, the user may drag the current live streaming position 403 to the playback start position 404 to play back the advertisement that the user did not hear in the past.

Before the current playback operation, the user may set a parameter of the playback function in playback preference 401. Setting the parameter may include setting a number of playback repetition times. Setting the playback preference 401 may include automatically matching the playback speed matching the playback repetition times. The playback preference 401 may also be a predetermined default condition. For example, the predetermined default condition may include that the playback is repeated two times. Setting the playback preference 401 may include setting the playback speed to 1.4 time-speed.

After the user drags the current live streaming position 403, the live streaming radio program may be quickly positioned to the time point corresponding to the playback start position 404. The user may listen to the live streaming advertisement in the past. The playback advertisement may be played at 1.4 time-speed. The playback content may include the contact information of the advertisement that the user did not hear. Meanwhile, the radio 301 may be configured to cache the live streaming content of the radio station 302 that is live streaming after the current live streaming position 403.

Within a certain time period, the playback may reach the current live streaming position 403. The radio 301 may continue to play back the live streaming content after the current live streaming position 403 of the radio station 301. When the playback ends, the playback may be switched to the live streaming radio station 301. The user may continue to listen to the live streaming radio program.

After driving, the user may recall a store location in the playback advertisement remembers that the user does not remember, and the user may need to listen one more time. The user may operate the self-defined playback history 402 in the display interface. Then, a pop-up window 509 may be displayed. The user may review the playback history record 510 saved in the pop-up window 509. Each of the playback history records 510 in the pop-up window 509 may be named with the frequency band value of the radio station 302 that is listened to and the playback time information. For example, the playback advertisement performed by the user may be named in the form of "95.2_20211209_082432." 95.2 may represent the frequency band of the radio station 302 that is listened to, 20211209 may represent the date the user listens to, and 082432 may represent the corresponding system time 303 and the playback detailed time point. The user may operate the corresponding location to listen to the playback advertisement again and record the store location that the user needs.

Figure 6:
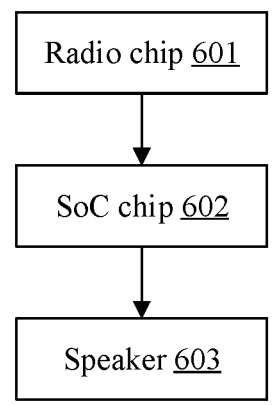
FIG. 6 is a schematic diagram of a real-time service playback device according to some embodiments of the present disclosure.

FIG. 6 is a schematic diagram of a real-time service playback device according to some embodiments of the present disclosure.

The real-time service playback device includes a communication unit, a processor, and a cache unit. The communication unit may be controlled by the processor to receive the live streaming content of the real-time service. The cache unit may be controlled by the processor to save the live streaming content from the communication unit. The cache unit may be configured to play the stored live streaming content starting from the time coordinate of the first anchor point at the time-speed in response to receiving the input instruction until the playback is completed, and the real-time playing of the live streaming content is resumed. In some embodiments, the communication unit is a radio chip 601, and the processor and the cache unit are a system-on-chip (SoC) chip and a module of the SoC chip. The audio data of the radio chip 601 may need to be transmitted to the SoC chip 602 first, and then the SoC chip 602 may be configured to cache the audio data. The audio data may be played through a speaker 603.

In some embodiments, the radio program may be live streaming the radio program. The live streaming service may be currently in the running state. The radio chip 601 may be configured to transmit the audio data to the SoC chip 602. The SoC chip 602 may be configured to cache the live streaming audio data. The playback service may be currently in the ready state.

During the live streaming of the radio program, the radio program may receive the playback instruction. The playback instruction may include playing repeatedly the audio data that was live streamed in the past.

The radio program may instruct the SoC chip to play the audio data that was live streamed in the past through the speaker 603. The playback service may be in the running state, and the live streaming service may be in the ready state.

The playing may be the playback at a certain speed.

A unique name identifier may be assigned for the playback audio data.

When the playback process reaches the service operation switching node, the live streaming service may be in the running state, and the playback service may be in the ready state. The live streaming of the radio program may be resumed. The radio chip 601 may transmit the audio data to the SoC chip 602. The SoC chip 602 may cache the live streaming audio data.

Figure 7:
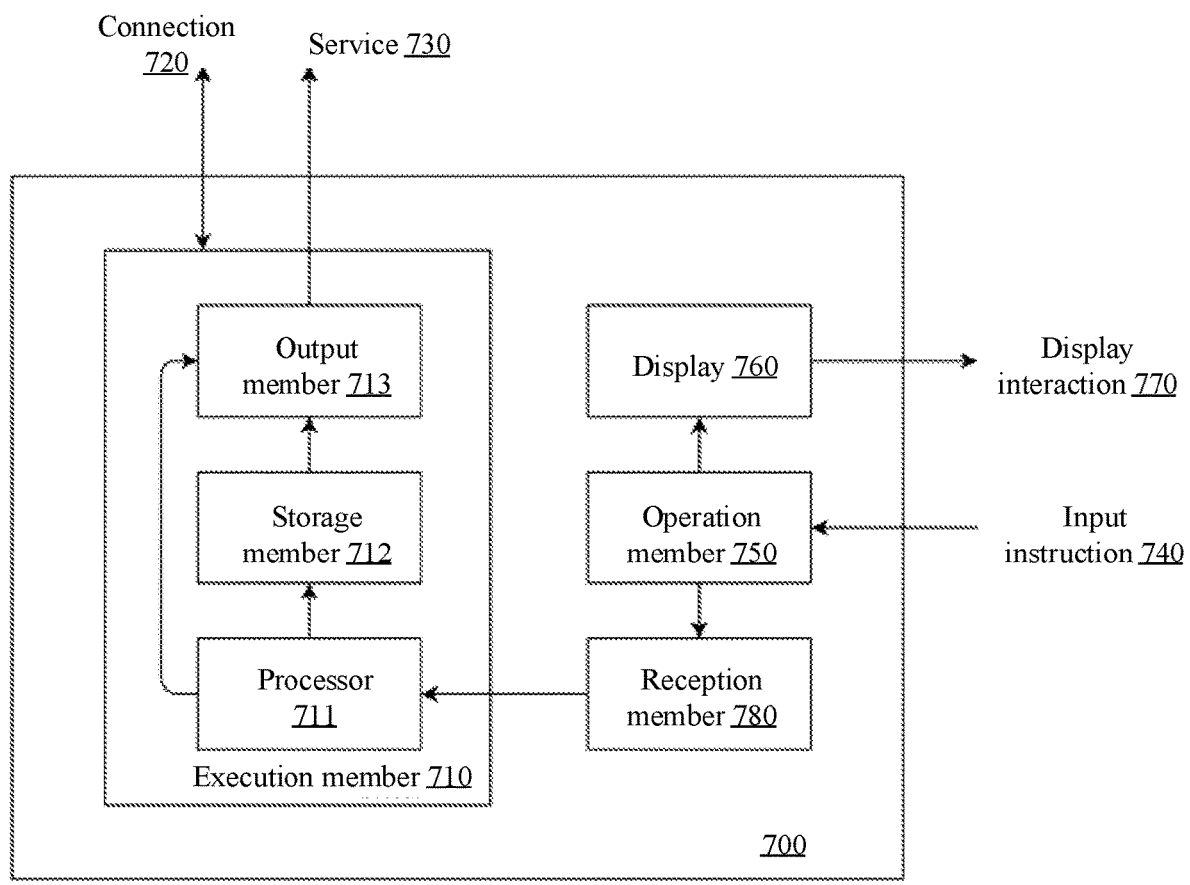
FIG. 7 is a schematic diagram of a system for performing real-time service playback according to some embodiments of the present disclosure.

FIG. 7 is a schematic diagram of a system 700 for performing real-time service playback according to some embodiments of the present disclosure.

The system 700 may include a device that can provide the real-time service playback function or a system formed by a combination of the device and other devices that can provide the real-time service playback function.

The system 700 includes an execution member 710, a connection 720 executed by the execution member 710, a service 730 executed by the execution member 710, an input instruction 740, an operation member 750 configured to receive the input instruction 740, a display 760 where the operation member 750 feedback information, a display interaction 770 between the display 760 and the user, and a reception member 780 configured to transmit the information indicated by the input instruction 740 to the execution member 710.

The system 700 at least includes the execution member 710, the connection 720 executed by the execution member 710, the service 730 executed by the execution member 710, and the input instruction 740.

In some embodiments, the system 700 further includes the operation member 750 configured to receive the input instruction 740, the display 760 where the operation member 750 feedback information, the display interaction 770 between the display unit 660 and the user 770, the reception member 780 configured to transmit the information indicated to by the input instruction 740 to the execution member 710.

The input instruction 740 may be the real-time service playback function selected by the user as needed. The input instruction 740 may be executed through the operation member 750. For example, the user may click and select through a touch screen in a device that can be touched and operated.

In response to the user selection through the operation member 750, the display 760 may perform the display interaction 770 to feed back the result of the input instruction 740 for the user.

The reception member 780 may be configured to transmit the information indicated by the input instruction 740 to the execution member 710.

The execution member 710 includes a processor 711, a storage member 712, and an output member 713.

The execution member 710 may be configured to establish a connection 720 with a service providing source, and provide a service 730 through the output member 713. The service 730 may include a real-time service and a playback service.

During an operation process of the real-time service, the processor 711 in the execution member 710 may be configured to instruct the output member 713 in the execution member 710 to provide the real-time service. The real-time service may be in the running state, and the playback service may be in the ready state.

When the processor 711 receives the information indicated by the input instruction 740, the processor 711 may parse the information. For example, the information may include an instruction for real-time service playback, a confirmation instruction of the playback start time node, and a calculation instruction of the service operation switching node where the playback service and the real-time service may be switched.

The processor 711 may be configured to parse the real-time service playback instruction to obtain a playback speed instruction and a playback repetition number instruction.

The processor 711 may be configured to instruct the output member 713 to temporarily stop the real-time service and call the real-time content stored in the storage member 712 of the execution member 710. The storage member 712 may store the real-time content during the operation process of the real-time service.

The processor 711 may be configured to indicate, that is call, the real-time content stored in the storage member 712 and provide the playback service through the output member 713. The playback service may be in the running state, and the real-time service may be in the ready state.

In some embodiments, when the real-time service is running, the user may operate the input instruction 740 through the operation member 750. For example, the operation member 750 may be the screen of the device that can be touched and operated. The operation action of the input instruction 740 may be realized by clicking on the playback function icon provided on the screen.

The display 760 may perform the display interaction 770 to provide feedback to a result of the user input instruction 740 at the operation member 750. For example, on the screen, the user may perform click feedback at the playback function icon, and the display may temporarily display a hint text "Playback is about to start soon."

The reception member 780 may be configured to transmit the playback service information indicated by the input instruction 740 to the execution member 710.

The processor 711 may be configured to parse the information. For example, the information may include the real-time service playback instruction, the determination instruction of the playback start time node, and the calculation instruction of the service operation switching node of the switching between the playback service and the real-time service.

The processor 711 may be configured to instruct to call the real-time content stored in the storage member 712 in the execution member 710. The storage member 712 may be used to store the real-time content when the real-time service is running.

The processor 711 may be configured to parse the real-time service playback instruction to obtain the playback speed instruction and the playback repetition number instruction.

The processor 711 may be configured to instruct to pause the real-time service, call the real-time content stored in the storage member 712, and provide the playback service through the output member 713 in the execution member 710.

After the output member 713 completes the playback service indicated by the input instruction, the processor 711 may instruct the output member 713 in the execution member 710 to continue to provide the real-time service to the user. The real-time service may be resumed.

Corresponding structures, actions, behaviors, and equivalents of all device elements or step elements in the present disclosure are intended to include any structures, actions, behaviors for performing the function in conjunction with other claimed members as specifically claimed. The description of embodiments of the present disclosure has been provided for a disclosing purpose. Embodiments of the present disclosure may tend to include various modifications and equivalent arrangements and may not to be exhaustive or limiting. The terms here are chosen to best explain the principles of the embodiments and the practical application or the technical improvement better than the technology found in the marketplace. The purpose of the present disclosure may have been effectively implemented. The function and the structural principle of the present disclosure have been shown and described in embodiments of the present disclosure. Without departing from the principle of the present disclosure, any modifications or variations may be performed on embodiments of the present disclosure.

What is claimed is:

1. A real-time service playback method comprising:
during running a real-time service, receiving an input instruction to obtain a playback speed and a time coordinate of a first anchor point, the time coordinate of the first anchor point being a start point of playback, and in response to the input instruction, stopping playing a real-time content of the real-time service, wherein the playback speed is based on with a number of repetitions of the playback of the real-time content;
based on the time coordinate of the first anchor point, calculating a time coordinate of a second anchor point in future, the time coordinate of the second anchor point being an end point of the playback; and
reading and storing a real-time content between a time coordinate value of the first anchor point and a time coordinate value of the second anchor point to play according to the playback speed until the playback reaches the time coordinate value of the second anchor point to resume the real-time service.

2. The method according to claim 1, wherein the time coordinate of the first anchor point is determined by the input instruction at a past time point of the real-time service.

3. The method according to claim 1, wherein the time coordinate of the second anchor point is a time point of resuming the current real-time service.

4. The method according to claim 1, wherein:
a value assigned to each time point corresponding to a running process of the real-time service is a time coordinate value of an anchor point.

5. The method according to claim 1, wherein:
the reading and storing the real-time content indicated by the input instruction is obtained by at least one of offline cache or local download.

6. The method according to claim 5, further comprising:
adding a self-defined identifier for the real-time content indicated by the input instruction.

7. The method according to claim 6, wherein:
an adding rule of the self-defined identifier is obtained according to real-time service information, system time information, and time coordinate value information.

8. A service switching method comprising, when a real-time service is in a running state, and a playback service is in a ready state:
in response to the playback service being in a ready state, storing the real-time content of the real-time service;
receiving an input instruction, switching the real-time service to the playback service, the playback service entering a running state to playback the stored real time content, and the real-time service being in the ready state, and according to the input instruction, determining a service operation switching node of switching the playback service to the real-time service, and in response to the playback service running to the service operation switching node, switching the real-time service back to the running state to playback the real time content of the real-time service, and switching the playback service in the ready state, wherein the input instruction indicating a playback speed that is based on a number of repetitions of the playback of the real-time content.

9. The method according to claim 8, wherein:
the input instruction includes selecting a start time point, the playback speed, and the number of playback repetitions of the playback service, the input instruction indicating the real-time content of a certain time period.

10. The method according to claim 8, further comprising:
in response to the playback service being in the running state, playing the stored real-time content required by the input instruction.

11. The method according to claim 8, further comprising:
in response to the real-time service being in the ready state, caching real-time content data from a current time point to an end time point.

12. The method according to claim 8, further comprising:
after the real-time service is switched back to the running state, resuming the real-time service.

13. A real-time service playback device comprising:
a communication unit;
a cache unit; and
a processor configured to:
   control the communication unit to receive a live streaming content of a real-time service;
   control the cache unit to:
      store the live streaming content from the communication unit;
      in response to receiving an input instruction, play the stored live streaming content from a time coordinate of a first anchor point at a playback speed, wherein the input instruction indicating a playback speed that is based on a number of repetitions of the playback of the real-time content; and
   in response to finishing playing the stored live streaming content, resuming the live streaming content that is played in real-time.

14. The device according to claim 13, wherein:
in response to the playback service being in a ready state, the processor is further configured to store the real-time content of the real-time service.

15. The device according to claim 13, wherein:
the input instruction includes selecting the anchor point, the playback speed, and the number of playback repetitions of the playback service, the input instruction indicating the real-time content of a certain time period.

16. The device according to claim 13, wherein:
in response to the playback service being in a running state, the processor is further configured to play the cached real-time content required by the input instruction.

17. The device according to claim 13, wherein:
according to the input instruction, the processor is further configured to determine a service operation switching node for switching a playback service to the real-time service, and in response to the playback service running to the service operation switching node, switching the real-time service back to a running state, and switching the playback service in a ready state.

18. The device according to claim 13, wherein:
after the real-time service is switched back to a running state, the processor is further configured to resume the real-time service.

* * * * *